(12) United States Patent
Murasato

(10) Patent No.: US 11,979,046 B2
(45) Date of Patent: May 7, 2024

(54) VEHICLE ELECTRICAL COMPONENT MOUNTING ARRANGEMENT

(71) Applicant: Toyota Jidosha Kabushiki Kaisha, Toyota (JP)

(72) Inventor: Kenji Murasato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 16/734,684

(22) Filed: Jan. 6, 2020

(65) Prior Publication Data

US 2020/0223487 A1 Jul. 16, 2020

(30) Foreign Application Priority Data

Jan. 10, 2019 (JP) .................... 2019-002411

(51) Int. Cl.

| | |
|---|---|
| *H02J 7/00* | (2006.01) |
| *B60H 1/00* | (2006.01) |
| *B60K 1/00* | (2006.01) |
| *B60K 1/04* | (2019.01) |
| *B60L 1/02* | (2006.01) |

(Continued)

(52) U.S. Cl.
CPC ........ *H02J 7/0042* (2013.01); *B60H 1/00385* (2013.01); *B60K 1/00* (2013.01); *B60K 1/04* (2013.01); *B60L 1/02* (2013.01); *B60L 50/64* (2019.02); *B62D 21/09* (2013.01); *B62D 21/15* (2013.01); *B60L 53/16* (2019.02); *B60L 53/18* (2019.02); *B60L 53/22* (2019.02)

(58) Field of Classification Search
CPC ........ Y02T 10/70; H02J 7/0042; B62D 25/08; B62D 21/15; B62D 21/09; B60L 53/18; B60L 53/16; B60L 53/22; B60L 50/64; B60L 1/02; B60H 1/00385
See application file for complete search history.

(56) References Cited

U.S. PATENT DOCUMENTS

| | | | |
|---|---|---|---|
| 7,150,159 B1 * | 12/2006 | Brummett | B60H 1/3226 62/239 |
| 2011/0006733 A1 * | 1/2011 | Tatebayashi | H02J 7/007182 320/116 |

(Continued)

FOREIGN PATENT DOCUMENTS

| | | |
|---|---|---|
| CN | 103702849 A | 4/2014 |
| CN | 104428152 A | 3/2015 |

(Continued)

*Primary Examiner* — Richard Isla
*Assistant Examiner* — Johali A Torres Ruiz
(74) *Attorney, Agent, or Firm* — Dinsmore & Shohl LLP

(57) ABSTRACT

A vehicle includes: a vehicle main body having an end surface and a compartment; a first electrical component which is arranged within the compartment, and to which a voltage that is more than or equal to a predetermined value is applied during traveling; and a second electrical component which is arranged within the compartment, and to which a voltage that is less than the predetermined value is applied during traveling or no voltage is applied during traveling. A first main body portion of the first electrical component and a second main body portion of the second electrical component are arranged such that a first end surface is located closer to a vehicle center than a second end surface in a vehicle front-back direction.

10 Claims, 5 Drawing Sheets

(51) Int. Cl.
   *B60L 50/64*   (2019.01)
   *B62D 21/09*   (2006.01)
   *B62D 21/15*   (2006.01)
   *B60L 53/16*   (2019.01)
   *B60L 53/18*   (2019.01)
   *B60L 53/22*   (2019.01)

(56) References Cited

U.S. PATENT DOCUMENTS

| | | | | |
|---|---|---|---|---|
| 2012/0055724 | A1* | 3/2012 | Iwasa | B60L 53/11 |
| | | | | 180/68.5 |
| 2013/0106141 | A1 | 5/2013 | Yamashita | |
| 2013/0134939 | A1* | 5/2013 | Sato | B60L 50/51 |
| | | | | 320/109 |
| 2014/0338997 | A1* | 11/2014 | Okada | B62D 25/08 |
| | | | | 180/68.5 |
| 2015/0021114 | A1 | 1/2015 | Hotta et al. | |
| 2015/0097425 | A1 | 4/2015 | Kimura et al. | |
| 2015/0122561 | A1* | 5/2015 | Kashiwai | B60K 1/00 |
| | | | | 180/65.6 |
| 2015/0305177 | A1 | 10/2015 | Nakashima | |
| 2016/0244052 | A1* | 8/2016 | Hirabayashi | B60H 1/04 |
| 2016/0339839 | A1* | 11/2016 | Hatsumi | B60L 53/14 |
| 2019/0275858 | A1* | 9/2019 | Seki | B60H 1/00907 |
| 2019/0300063 | A1* | 10/2019 | Sasaki | B62D 1/195 |

FOREIGN PATENT DOCUMENTS

| | | |
|---|---|---|
| JP | H06-197417 A | 7/1994 |
| JP | 2011-006050 A | 1/2011 |
| JP | 2012-076540 A | 4/2012 |
| JP | 2013-095153 A | 5/2013 |
| JP | 2015-205597 A | 11/2015 |
| JP | 2018-114899 A | 7/2018 |

* cited by examiner

VEHICLE ELECTRICAL COMPONENT MOUNTING ARRANGEMENT

CROSS REFERENCE TO RELATED APPLICATIONS

This nonprovisional application claims priority in Japanese Patent Application No. 2019-002411 filed on Jan. 10, 2019 with the Japan Patent Office, the entire contents of which are hereby incorporated by reference.

BACKGROUND

Field

The present disclosure relates to a vehicle.

Description of the Background Art

Japanese Patent Laying-Open No. 2018-114899 discloses a vehicle including a power controller that controls power to be supplied to a traveling motor. In this vehicle, the power controller and a connector are arranged within a front compartment. The above publication discloses a technique that enables the connector provided at the back of a case of the power controller to be protected even when a vehicle collision (so called a front collision) occurs.

Within a front compartment of a vehicle, not only a power controller but also a plurality of electrical components are arranged. When a vehicle has a rear compartment, a plurality of electrical components may be arranged within the rear compartment.

SUMMARY

Vehicles such as a hybrid vehicle, a plug-in hybrid vehicle, and an electric vehicle are often equipped with an electrical component to which a high voltage is applied during traveling, within a compartment. A vehicle including only a common combustion engine as a drive source may also be equipped with such an electrical component within a compartment. In some embodiments, not only is a connector connected to such an electrical component to which a high voltage is applied, but also the electrical component itself to which the high voltage is applied, to be less likely to be broken when a vehicle collision occurs.

For example, assume that a first electrical component and a second electrical component as described below are arranged within a front or rear compartment. To the first electrical component, a high voltage (specifically, a voltage that is more than or equal to a predetermined value) is applied during traveling. To the second electrical component, a low voltage (specifically, a voltage that is less than the predetermined value) is applied during traveling, or no voltage is applied during traveling.

Assume that the first electrical component and the second electrical component as described above are arranged within a front compartment. Assume that, with a high voltage being applied to the first electrical component during traveling, a collision load acts on a vehicle main body from a front side, along a direction parallel to a vehicle front-back direction. On this occasion, a low voltage is applied or no voltage is applied to the second electrical component. When comparison is made between the first electrical component and the second electrical component, from the viewpoint of suppressing breakage of the dust electrical component, a load that acts on the first electrical component may be smaller than a load that acts on the second electrical component.

The first electrical component and the second electrical component as described above may be arranged within a rear compartment. Assume that, with a high voltage being applied to the first electrical component during traveling, a collision load acts on the vehicle main body from a back side, along the direction parallel to the vehicle front-back direction. On this occasion, a low voltage is applied or no voltage is applied to the second electrical component. Also in this case, from the viewpoint of suppressing breakage of the first electrical component, a load that acts on the first electrical component may be smaller than a load that acts on the second electrical component.

An object of the present disclosure is to provide a vehicle including a structure which can suppress a large load from acting on an electrical component within a compartment, even when a collision load acts on a vehicle main body along a direction parallel to a vehicle front-back direction with a high voltage being applied to the electrical component.

A vehicle based on the present disclosure includes: a vehicle main body having an end surface located at an end portion in a vehicle front-back direction, and a compartment provided closer to a vehicle center in the vehicle front-back direction relative to the end surface; a first electrical component which is arranged within the compartment, and to which a voltage that is more than or equal to a predetermined value is applied during traveling; and a second electrical component which is arranged within the compartment, and to which a voltage that is less than the predetermined value is applied during traveling or no voltage is applied during traveling. The first electrical component includes a first main body portion, and a first end surface located on a side of the first main body portion closer to the end surface. The second electrical component includes a second main body portion, and a second end surface located on a side of the second main body portion closer to the end surface. The first main body portion of the first electrical component and the second main body portion of the second electrical component are arranged such that the first end surface is located closer to the vehicle center than the second end surface in the vehicle front-back direction.

With the above configuration, since the second end surface is located closer to the end surface than the first end surface by a predetermined dimension, a collision load or a load generated in association with the collision load is likely to act on the second end surface, in advance of the first end surface. Even when a collision load acts on the vehicle main body along a direction parallel to the vehicle front-back direction, the second electrical component to which no voltage is applied is likely to receive the collision load first. Since the second electrical component receives the collision load first, a load that may act on the first electrical component is decreased. This can effectively suppress a large load from acting on the first electrical component.

The vehicle may further include a battery, and the second electrical component may be a charger for charging the battery by a voltage being applied during stopping.

With the above configuration, by using the charger to which no voltage is applied during traveling as the second electrical component, influence on other devices due to a voltage can be prevented in case of a collision.

In the vehicle, the first electrical component may be a water-heating heater for warming an inside of a vehicle cabin.

With the above configuration, the inside of the vehicle cabin can be appropriately warmed even when no engine is mounted in the vehicle main body. By using heat generated during charging for the water-heating heater after charging as residual heat, heating performance immediately after the start of traveling can also be improved.

The vehicle may further include a bracket. The first main body portion of the first electrical component and the second main body portion of the second electrical component may be integrated via the bracket. The bracket may fix the first main body portion of the first electrical component to the vehicle main body, and may fix the second main body portion of the second electrical component to the vehicle main body.

With the above configuration, even when a collision load acts on the vehicle main both, a force component that intends to displace the first electrical component in the same direction as that of the collision load acts on the first electrical component as the collision load is applied. The force component acts in a direction opposite to a direction in which the first electrical component approaches a collision object. The possibility that the first electrical component may receive a load directly from the collision object is further reduced, which can further suppress the first electrical component from being broken, when compared with a case where the first electrical component and the second electrical component are not integrated.

In the vehicle, a width dimension of the first end surface in a vehicle width direction may be shorter than a width dimension of the second end surface in the vehicle width direction.

With the above configuration, a range in which the first electrical component can be protected by the second electrical component is further expanded, which can further suppress a large load from acting on the first electrical component, when compared with a case where the width dimension of the first end surface is longer than the width dimension of the second end surface, for example.

The above configuration can suppress a large load from acting on an electrical component within a compartment, even when a collision load acts on a vehicle main body along a direction parallel to a vehicle front-back direction with a high voltage being applied to the electrical component.

The foregoing and other objects, features, aspects, and advantages of the present disclosure will become more apparent from the following detailed description of the present disclosure when taken in conjunction with the accompanying drawings.

DETAILED DESCRIPTION

Figure 1:
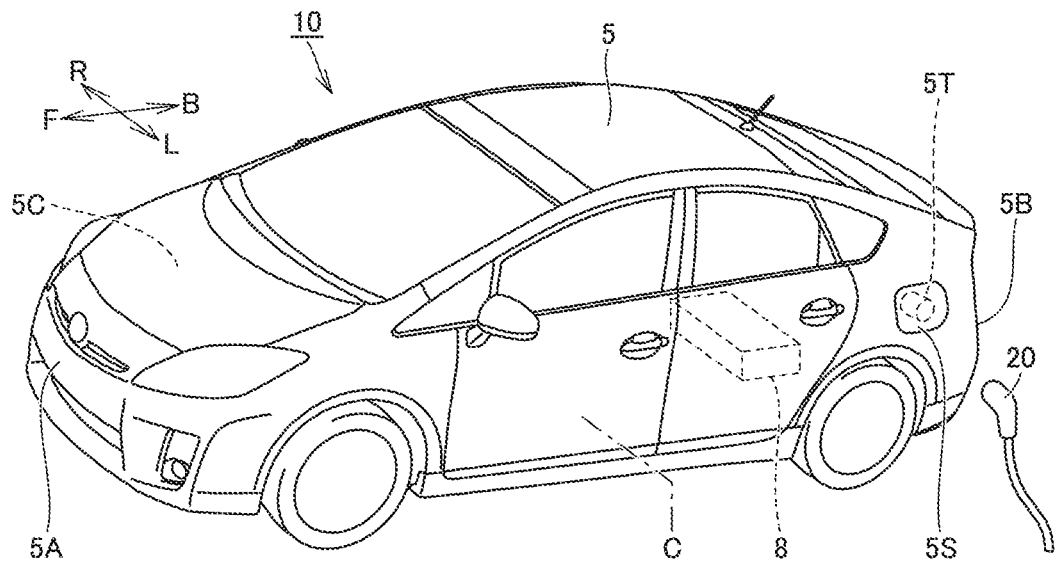
FIG. 1 is a perspective view showing a vehicle 10 in a first embodiment.

Hereinafter, embodiments will be described with reference to the drawings. In the description below, identical or corresponding parts will be designated by the same reference numerals, and an overlapping description may not be repeated.

First Embodiment (Vehicle 10)

A vehicle 10 in a first embodiment will be described with reference to FIGS. 1 to 6. FIG. 1 is a perspective view showing vehicle 10. In FIG. 1, arrows F and B indicate a vehicle front-back direction of vehicle 10, and arrows L and R indicate a vehicle width direction of vehicle 10. Arrow F, B, L, and R indicate a front side, a back side, a left side, and a right side, respectively. The meaning of these arrows is also applied in common to the drawings described later.

Figure 2:
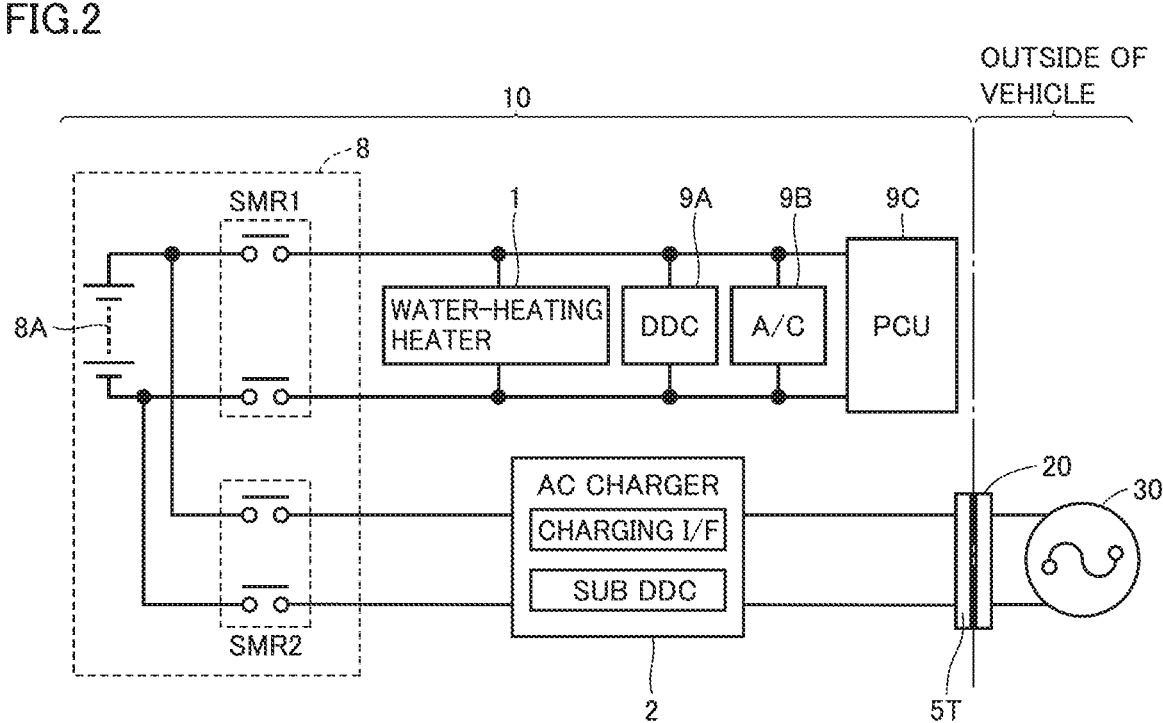
FIG. 2 is a view showing a circuit configuration of a water-heating heater 1, a charger 2, a battery 8, and the like included in vehicle 10 in the first embodiment.
Figure 3:
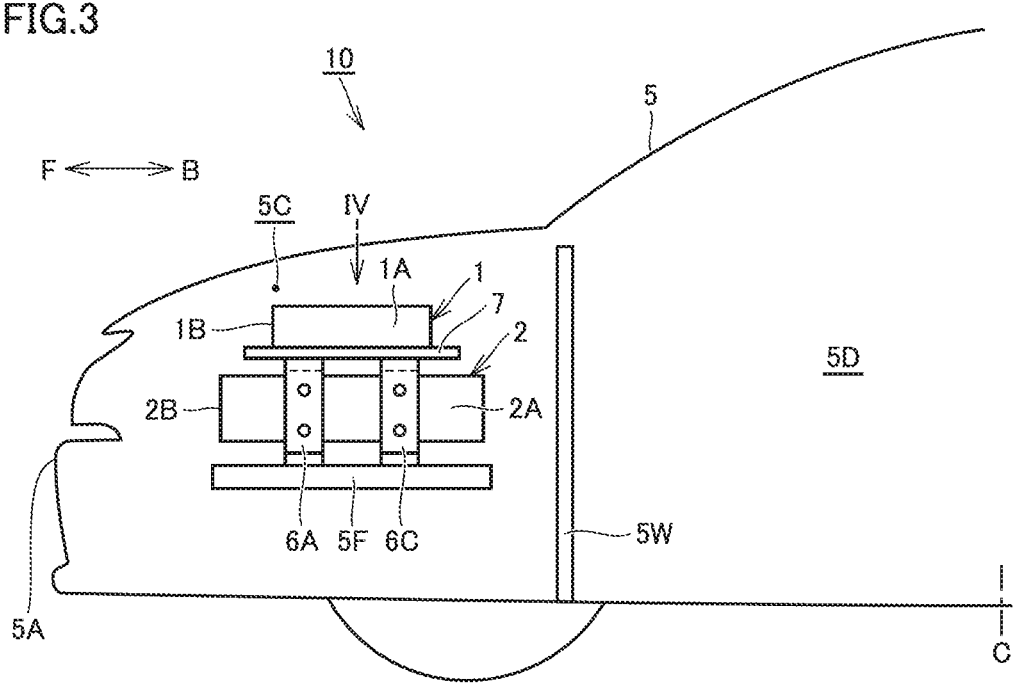
FIG. 3 is a side view showing an internal configuration of a front compartment 5C of vehicle 10 in the first embodiment.

FIG. 2 is a view showing a circuit configuration of a water-heating heater 1, a career 2, a battery 8, and the like included in vehicle 10. FIG. 3 is a side view showing an internal configuration of a front compartment 5C of vehicle 10.

As shown in FIGS. 1 to 3, vehicle 10 includes a vehicle main body 5 (FIG. 1, FIG. 3), water-heating heater 1 (FIG. 2, FIG. 3), charger 2 (FIG. 2, FIG. 3), and battery 8 (FIG. 1, FIG. 2). Water-heating heater 1 can function as a "first electrical component". Charger 2 can function as a "second electrical component".

Vehicle main body 5 (FIG. 1) has a front end surface 5A, a back end surface 5B, front compartment 5C (a compartment), a cover 5S, and an inlet 5T. Front end surface 5A (an end surface) is located at a front end portion of vehicle main body 5 in the vehicle front-back direction, and back end surface 5B (an end surface) is located at a back end portion of vehicle main body 5 in the vehicle front-back direction.

Front compartment 5C is provided closer to a vehicle center C in the vehicle front-back direction relative to front end surface 5A. Vehicle center C is a portion of vehicle main body 5 located at the exact center in the vehicle front-back direction. Front compartment 5C is located between front end surface 5A and vehicle center C in the vehicle front-back direction. Both water-heating heater 1 and charger 2 are arranged within front compartment 5C (the details will be described later with reference to FIG. 3).

Cover 5S is provided at an arbitrary position in an outer circumferential surface (here, a side surface) of vehicle main body 5. An opening is formed in vehicle main body 5, and cover 5S opens and closes this opening. Inlet 5T is exposed when cover 5S is opened. Battery 8 is mounted in vehicle main body 5. In battery 8 (FIG. 2), a power storage element 8A, relays SMR1 and SMR2, and the like are provided.

During traveling, relay SMR1 is set to an ON state, and relay SMR2 is set to an OFF state. Power from battery 8 is supplied, via a converter 9A, to an air conditioner 9B, a power controller 9C, and the like. During traveling, water-heating heater 1 is also electrically connected to battery 8, and a voltage that is more than or equal to a predetermined value is applied to water-heating heater 1.

Water-heating heater 1 has a pipe, for example, through which water circulates. Air is supplied into a vehicle cabin 5D (FIG. 3) by a fan not shown. The air is warmed by a heat exchange function of water-heating heater 1. During traveling, water-heating heater 1 is operated, and thereby the inside of vehicle cabin 5D is warmed. On the other hand, during traveling, charger 2 is not electrically connected to battery 8, and no voltage is applied to charger 2.

During stopping, battery 8 is charged with a charging connector 20 being connected to inlet 5T. During stopping, relay SMR1 is set to an OFF state as necessary, and relay SMR2 is set to an ON state. Power from a commercial power supply 30 or the like is supplied to battery via charging connector 20 and changer 2, and thereby power storage element 3A is charged.

Figure 4:
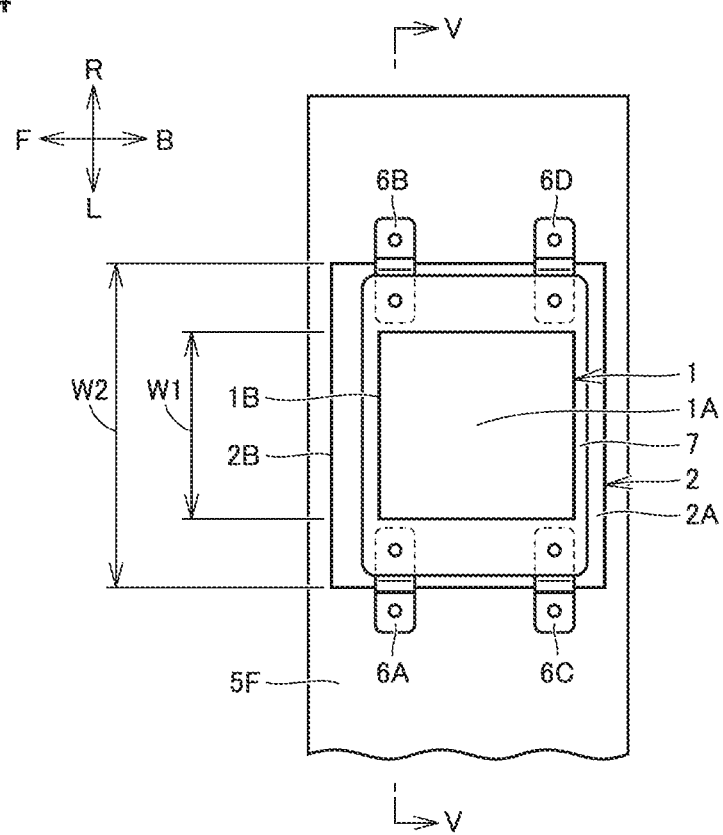
FIG. 4 is a top view showing the internal configuration of front compartment 5C of vehicle 10 in the first embodiment, illustrating a state obtained when the internal configuration is viewed along a direction indicated by an arrow IV in FIG. 3.
Figure 5:
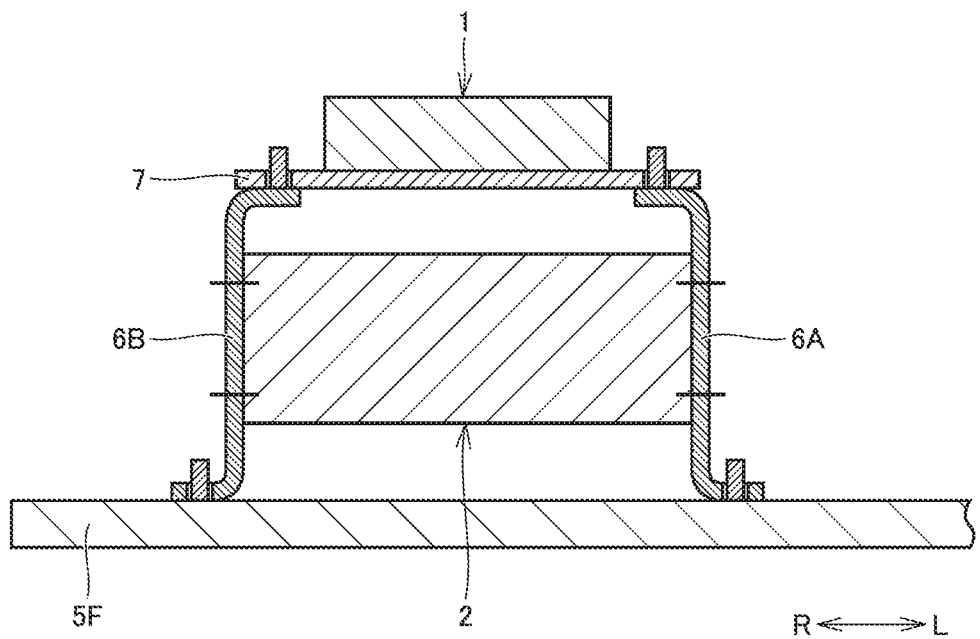
FIG. 5 is a cross sectional view taken along a line V-V in FIG. 4 and viewed in a direction of arrows.

FIG. 4 is a top view showing the internal configuration of front compartment 5C, illustrating a state obtained when the internal configuration is viewed along a direction indicated by an arrow IV in FIG. 3. FIG. 5 is a cross sectional view taken along a line V-V in FIG. 4 and viewed in a direction of arrows.

(Water-Heating Heater 1 and Charger 2)

A partitioning wall 5W (FIG. 3) is provided in vehicle main body 5. Partitioning wall 5W divides the inside of vehicle main body 5 into front compartment 5C and vehicle cabin 5D. Inside front compartment 5C, a cross member 5F (a supporting member) extends in the vehicle width direction. Brackets 6A to 6D (FIG. 4) are fixed to an upper surface of cross member 5F.

A pedestal plate 7 is fixed to upper ends of brackets 6A to 6D (FIG. 5), and water-heating heater 1 is fixed to an upper surface of pedestal plate 7. Charger 2 is supported by brackets 6A and 6B between brackets 6A and 6B in the vehicle width direction, and is supported by brackets 6C and 6D between brackets 6C and 6D in the vehicle width direction.

As shown in FIGS. 3 and 4, water-heating heater 1 includes a main body portion 1A to first main body portion) and an end surface 1B (a first end surface). Main body portion 1A here has a substantially box-shaped outer shape, and end surface 1B is located on a side of main body portion 1A closer to front end surface 5A (FIG. 1, FIG. 3). In other words, end surface 1B is defined by a portion of outer surfaces of main body portion 1A located closer to front end surface 5A. Devices required to drive water-heating heater 1 are arranged inside main body portion 1A, and a water pipe not shown extends from main body portion 1A to the outside of main body portion 1A.

Charger 2 includes a main body portion 2A (a second main body portion) and an end surface 2B (a second end surface). Main body portion 2A here also has a substantially box-shaped outer shape, and end surface 2B is located on a side of main body portion 2A closer to front end surface 5A (FIG. 1, FIG. 3). End surface 2B is defined by a portion of outer surfaces of main body portion 2A located closer to front end surface 5A. Required devices such as a charging I/F and a converter are arranged inside main body portion 2A.

Main body portion 1A of water-heating heater 1 and main body portion 2A of charger 2 are arranged such that end surface 1B is located closer to vehicle center C (here, more backward) than end surface 2B in the vehicle front-back direction.

(Function and Effect)

Figure 6:
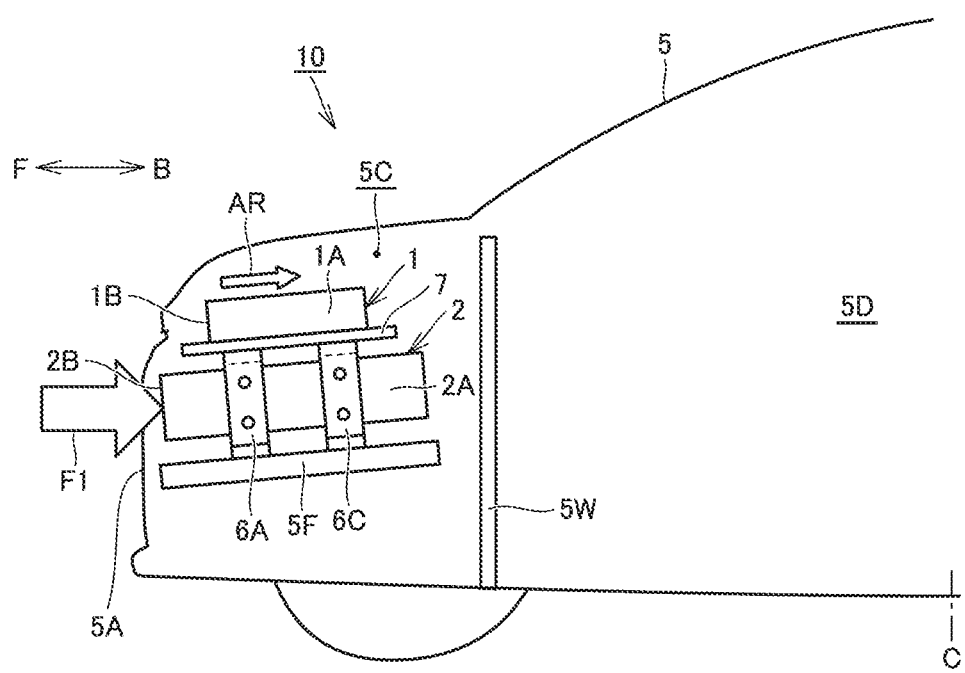
FIG. 6 is a side view showing the internal configuration of front compartment 5C of vehicle 10 in the first embodiment, illustrating a state when a collision from a front side occurs in vehicle 10.

FIG. 6 is a side view showing the internal configuration of to compartment 5C of vehicle 10, illustrating a state when a collision from the front side occurs in vehicle 10. Assume that, with a high voltage being applied to water-heating heater 1 during traveling, a collision load F1 acts on vehicle main body 5 from the front side, along a direction parallel to the vehicle front-back direction. On this occasion, no voltage is applied to charger 2.

In the present embodiment, main body portion 1A of water-heating heater 1 and main body portion 2A of charger 2 are arranged such that end surface 1B is located closer to vehicle center C than end surface 2B in the vehicle front-back direction. End surface 1B is located tonic backward than end surface 2B by a predetermined dimension. Collision load F1 (or a load generated in association with collision load F1) is likely to act on end surface 2B located more forward than end surface 1B, in advance of end surface 1B.

Therefore, even when a collision load acts on vehicle main body 5 along the direction parallel to the vehicle front-back direction with a high voltage being applied to water-heating heater 1 within front compartment 5C, charger 2 to which no voltage is applied is likely to receive the collision load first. Since charger 2 receives the collision load first, a load that may act on water-heating heater 1 is decreased. This can effectively suppress a large load from acting on water-heating heater 1.

Arranging a dedicated member for protecting water-heating heater 1 from a collision within front compartment 5C decreases a mounting space (a vacant space) within front compartment 5C, which may result in an increase in the physical size of the vehicle. By implementing a physical protective function for water-heating heater 1 by the presence of charger 2, it is possible to decrease the size of the dedicated member or to decrease the number of the dedicated members to be placed, for example, which can suppress an increase in the physical size of the vehicle. It can also be expected to reduce the manufacturing cost of vehicle 10.

An electrical component different from charger 2 may be used as the second electrical component, in the case of charger 2, no voltage is applied thereto during traveling in the present embodiment. The second electrical component used as the electrical component different from charger 2 may be any component to which a voltage that is lower than that for water-heating heater 1 (specifically, a voltage that is less than the predetermined value) is applied during traveling or no voltage is applied during traveling. By using a component to which no voltage is applied during traveling, such as charger 2, as the second electrical component, influence on other devices due to a voltage can be prevented in case of a collision.

An electrical component different from water-heating heater 1 may be used as the first electrical component. With water-heating heater 1, the inside of vehicle cabin 5D can be appropriately warmed even when no engine is mounted in vehicle main body 5. By using heat generated during charging for water-heating heater 1 after charging as residual heat, heating performance immediately after the start of traveling can also be improved. The technical idea of applying water-heating heater 1 as the first electrical component is also applicable to a hybrid vehicle and a plug-in hybrid vehicle, is also effectively applicable to an electric vehicle, and is further applicable to a vehicle including only a combustion engine, as a drive source.

In the present embodiment, main body portion 1A of water-heating heater 1 and main body portion 2A of charger 2 are integrated via brackets 6A to 6D (FIG. 4). Bracket 6A to 6D fix main body portion 1A of water-heating heater 1 to vehicle main body 5 (cross member 5F), and also fix maw body portion 2A of charger 2 to vehicle main body 5 (cross member 5F). With such a configuration, even when collision load F1 (FIG. 6) acts on vehicle main body 5, a force component AR (FIG. 6) that intends to displace water-heating heater 1 in the same direction as that of collision load F1 acts on water-heating heater 1 (a case constituting main body portion 1A) as collision load F is applied.

That is, since vehicle body 5 and water-heating heater 1 are integrated via brackets 6A to 6D, force component AR acts in a direction opposite to a direction in which water-heating heater 1 approaches a collision object. The possibility that water-heating heater 1 may receive a load directly from the collision object is further reduced, which can further suppress water-heating heater 1 from being broken, when compared with a case where water-heating heater 1 and charger 2 are not integrated.

In the present embodiment (FIG. 4), a width dimension W1 of end surface 1B of water-heating heater 1 in the vehicle width direction is shorter than a width dimension W2 of end surface 2B of charger 2 in the vehicle width direction. With such a configuration, a range in which water-heating heater 1 can be protected by charger 2 is further expanded, which can further suppress a large load from acting on water-heating heater 1, when compared with a case where width dimension W1 is longer than width dimension W2, for example.

[First Variation]

As described above with reference to FIGS. 3 to 5, in the first embodiment described above, water-heating heater 1 is arranged above charger 2 with a space therebetween. Although the result may vary depending on the position out which collision load F1 acts, the protective function of charger 2 for water-heating heater 1 can be improved as the distance between water-heating heater 1 and charger 2 is shorter, for example. A gap may be provided between water-heating heater 1 and charger 2, or water-heating heater 1 and charger 2 may be arranged to be adjacent to and overlap each other such that the second electrical component (charger 2) is in contact with the top of the first electrical component (water-heating heater 1) as necessary.

Figure 7:
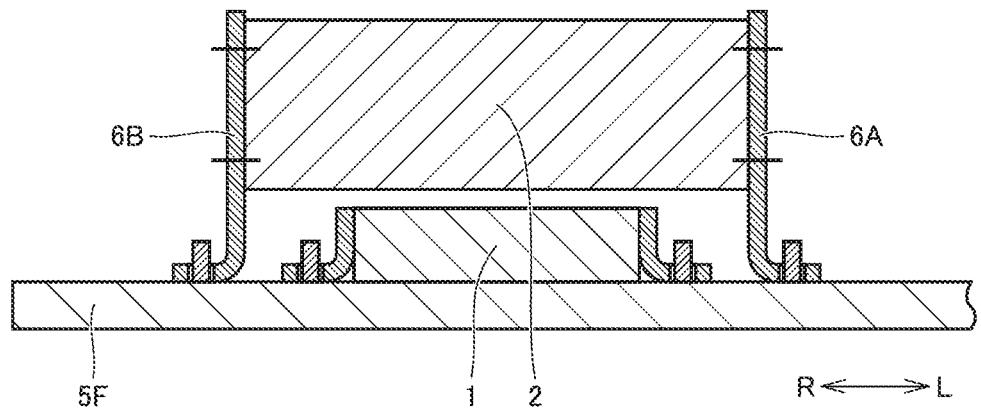
FIG. 7 is a cross sectional view for illustrating a first variation of the first embodiment, corresponding to FIG. 5.

As shown in FIG. 7, water-heating heater 1 may be arranged below charger 2. Water-heating heater may be separated front cross member 5F as with charger 2 in the ease of the first embodiment, or water-heating, heater 1 may be in contact with cross member 5F.

[Second Variation]

In the configuration shown in FIG. 4, when main body portion 1A of water-heating heater 1 is projected vertically downward, for example, the entire protected image thereof overlaps with main body portion 2A of charger 2. Such a configuration is not required, and when main body portion 1A of water-heating heater 1 projected vertically downward or upward, only a part of the projected image thereof may overlap with main body portion 2A of charger 2.

Figure 8:
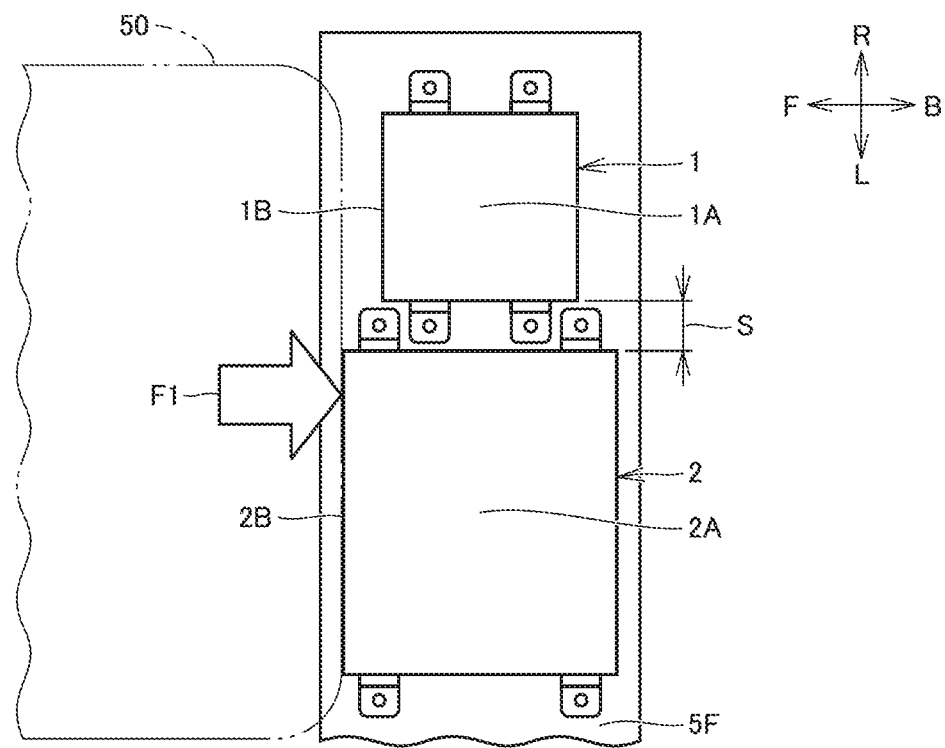
FIG. 8 is a top view for illustrating a second variation of the first embodiment, corresponding to FIG. 4.

As shown in FIG. 8, water-heating heater 1 and charger 2 may have such a relation that, when main body portion 1A of water-heating heater 1 is projected vertically downward or upward, for example, the entire projected image thereof does not overlap with main body portion 2A of charger 2, in the configuration shown in FIG. 8, water-heating heater 1 and charger 2 are adjacent to each other in the vehicle width direction.

Assume that collision load F1 acts on the vehicle main body from a collision object 50 on the front side, along the direction parallel to the vehicle front-back direction. Also in the configuration shown in FIG. 8, main body portion 1A of water-heating heater 1 and main body portion 2A of charger 2, are arranged such that end surface 1B is located closer to vehicle center C than end surface 2B in the vehicle front-back direction. Collision load F1 is likely to act on end surface 2B located more forward than end surface 1B, in advance of end surface 1B. Therefore, even with such a configuration, substantially the same effect as that in the case of the first embodiment described above can be achieved. Although the result may vary depending on the position on which collision load F1 acts, the protective function of charger 2 for water-heating heater 1 can be improved as a distance S between water-heating heater 1 and charger 2 is shorter, for example.

Second Embodiment

Figure 9:
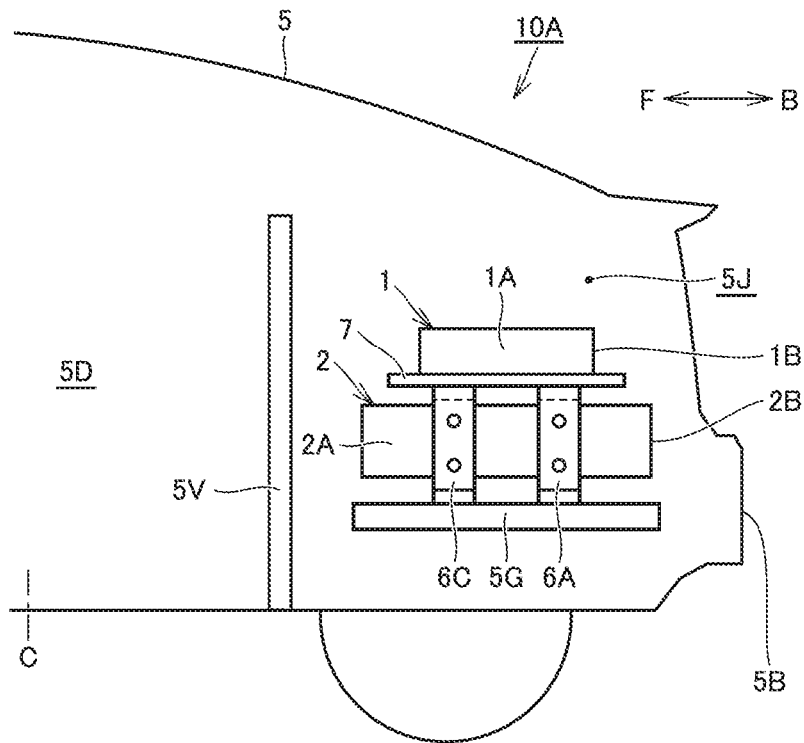
FIG. 9 is a side view showing an internal configuration of a rear compartment 5J of a vehicle 10A in a second embodiment.

FIG. 9 is a side view showing an internal configuration of a rear compartment 5J of a vehicle 10A in a second embodiment. As described in the beginning, electrical components such as water-heating heater 1 (a first electrical component) and charger 2 (a second electrical component) may be arranged within rear compartment 5J (a compartment), depending on the vehicle type.

In vehicle 10A, a partitioning wall 5V is provided in vehicle main body 5. Partitioning wall 5V divides the inside of vehicle main body 5 into rear compartment 5J and vehicle cabin 5D. Inside rear compartment 5J, a supporting member 5G extends in the vehicle width direction. Brackets 6A to 6D are fixed to an upper surface of supporting member 5G, as in the case of FIGS. 3 and 4 (here, only brackets 6A and 6C are shown).

Pedestal plate 7 is fixed to upper ends of brackets 6A to 6D, and water-heating heater 1 is fixed to an upper surface of pedestal plate 7. Charger 2 is supported by brackets 6A and 6B between brackets 6A and 6B in the vehicle width direction, and is supported by brackets 6C and 6D between brackets 6C and 6D in the vehicle width direction.

In the second embodiment, end surface 1B of water-heating heater 1 is located on a side of main body portion 1A closer to back end surface 5B. In other words, end surface 1B is defined by a portion of outer surfaces of main body portion 1A located closer to back end surface 5B. End surface 2B of charger 2 is located on a side of main body portion 2A closer to back end surface 5B. End surface 2B is defined by a portion of outer surfaces of main body portion 2A located closer to back end surface 5B. Main body portion 1A of water-heating heater 1 and main body portion 2A of charger 2 are arranged such that end surface 1B is located closer to center C (here, more forward) than end surface 2B in the vehicle front-back direction.

(Function and Effect)

Figure 10:
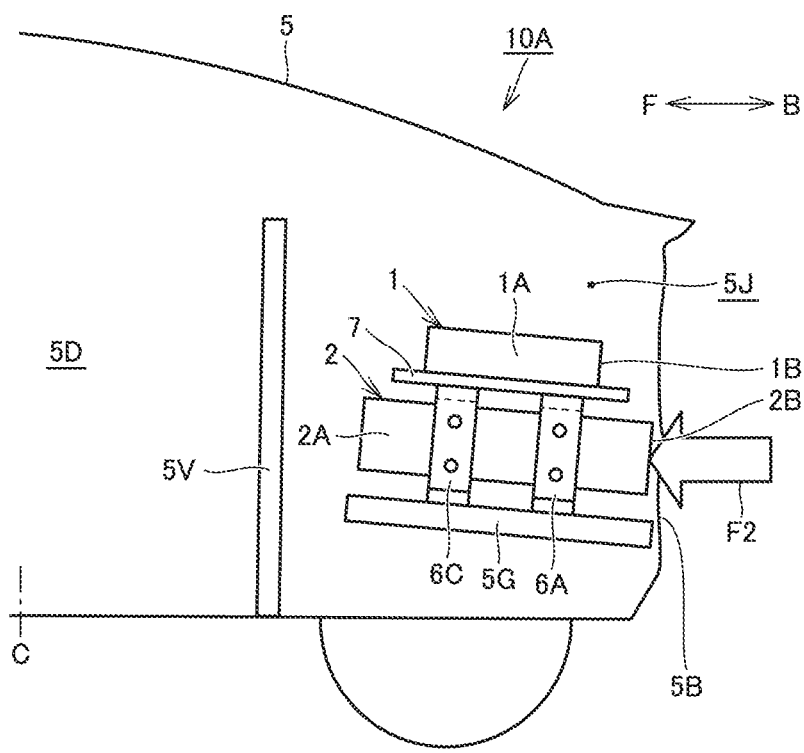
FIG. 10 is a side view showing the internal configuration of rear compartment 5J of vehicle 10A in the second embodiment, illustrating a state when a collision from a back side occurs in vehicle 10A.

FIG. 10 is a side view showing the internal configuration of rear compartment 5J of vehicle 10A, illustrating a state when a collision from a back side occurs in vehicle 10A. Assume that, with a high voltage being applied to water-heating heater 1 during traveling, a collision load F2 acts on vehicle main body 5 from the back side, along the direction parallel to the vehicle front-back direction. On this occasion, no voltage is applied to charger 2.

In the present embodiment, main body portion 1A of water-heating heater 1 and main body portion 2A of charger 2 are arranged such that end surface 1B is located closer to vehicle center C than end surface 2B in the vehicle front-back direction. End surface 1B is located more forward than end surface 2B by a predetermined dimension. Collision load F2 (or a load generated in association with collision load F2) is likely to at on end surface 2B located more backward than end surface 1R, in advance of end surface 1B.

Therefore, even when a collision load acts on vehicle main body 5 along the direction parallel to the vehicle front-back direction with a high voltage being applied to water-heating heater 1 within rear compartment 5J, charger 2 to which no voltage is applied is likely to receive the collision load first. Since charger 2 receives the collision load first, a load that may act on water-heating heater 1 is decreased. This can effectively suppress a large load from acting on water-heating heater 1.

Arranging a dedicated member for protecting water-heating heater 1 from a collision within rear compartment 5J decreases a mounting space (a vacant space) within rear compartment 5J, which may result in an increase in the physical size of the vehicle. By implementing a physical protective function for water-heating heater 1 by the presence of charger 2, it is possible to decrease the size of the dedicated member or to decrease the number of the dedicated members to be placed, for example, which can suppress an increase in the physical size of the vehicle. It can also be expected to reduce the manufacturing cost of vehicle 10A.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A vehicle comprising:
    a cabin;
    a vehicle main body having an end surface located at a first end portion in a vehicle front-back direction, and a compartment provided closer to a vehicle center in the vehicle front-back direction relative to the end surface;
    a first electrical component which is arranged within the compartment, and to which a voltage that is more than or equal to a predetermined value is applied during traveling; and
    a second electrical component which is arranged within the compartment, and to which a voltage that is less than the predetermined value is applied during traveling or no voltage is applied during traveling,
    the first electrical component including a first main body portion, and a first end surface located on a side of the first main body portion closer to the end surface,
    the second electrical component including a second main body portion, and a second end surface located on a side of the second main body portion closer to the end surface,
    the first main body portion of the first electrical component and the second main body portion of the second electrical component being arranged such that the first end surface is located closer to the vehicle center than the second end surface in the vehicle front-back direction,
    the compartment being positioned between the cabin and the end surface of the first end portion of the vehicle main body, wherein
    the vehicle further comprises a pair of brackets,
    the second electrical component being positioned between the pair of brackets, a lower end of the pair of brackets are fixed to a supporting member of the vehicle main body and an upper end of the pair of brackets are fixed to a pedestal plate, an upper surface of which the first electrical component is fixed, and the first main body portion of the first electrical component is fixed to the supporting member of the vehicle main body via the pair of brackets,
    the supporting member includes a second end portion located on a side of the end surface in the vehicle front-back direction,
    the first end surface is located closer to the vehicle center than the second end portion in the vehicle front-back direction.

2. The vehicle according to claim 1, further comprising a battery, wherein
    the second electrical component is a charger for charging the battery by a voltage being applied during stopping.

3. The vehicle according to claim 1, wherein the first electrical component is a water-heating heater for warming an inside of a vehicle cabin.

4. The vehicle according to claim 1, wherein
    the first main body portion of the first electrical component and the second main body portion of the second electrical component are integrated via the pair of brackets, and
    the pair of brackets fixes the first main body portion of the first electrical component to the vehicle main body, and fixes the second main body portion of the second electrical component to the vehicle main body.

5. The vehicle according to claim 1, wherein a width dimension of the first end surface in a vehicle width direction is shorter than a width dimension of the second end surface in the vehicle width direction.

6. The vehicle according to claim 1, wherein
    the second end surface is located closer to the vehicle center than the second end portion in the vehicle front-back direction.

7. The vehicle according to claim 1, wherein,
    the first main body portion of the first electrical component is fixed on the pedestal plate,
    the first main body portion of the first electrical component is fixed to the supporting member of the vehicle main body via the pedestal plate and the pair of brackets,
    on the pedestal plate,
    the pedestal plate includes a third end portion located on a side of the end surface in the vehicle front-back direction,
    the first end surface is located closer to the vehicle center than the third end portion in the vehicle front-back direction.

8. The vehicle according to claim 7, wherein
    the third end portion is located closer to the vehicle center than the second end surface in the vehicle front-back direction.

9. The vehicle according to claim 1, wherein
    when the first main body portion is projected vertically upward or downward, at least a part of a projected image of the first main body portion overlaps with the second main body portion.

10. The vehicle according to claim 1, wherein
when the first main body portion is projected vertically upward and downward, an entire projected image of the first main body portion does not overlap with the second main body portion.

* * * * *